(12) United States Patent
Saitoh et al.

(10) Patent No.: US 7,639,922 B2
(45) Date of Patent: Dec. 29, 2009

(54) AUTOREC SIGNAL MULTIPLEX APPARATUS, AUTOREC SIGNAL MULTIPLEX METHOD, PROGRAM, AND RECORDING MEDIUM

(75) Inventors: Hiroshi Saitoh, Osaka (JP); Hideaki Mita, Hyogo (JP)

(73) Assignee: Panasonic Corporaation, Osaka (JP)

( * ) Notice: Subject to any disclaimer, the term of this patent is extended or adjusted under 35 U.S.C. 154(b) by 629 days.

(21) Appl. No.: 10/511,831

(22) PCT Filed: Apr. 14, 2003

(86) PCT No.: PCT/JP03/04674

§ 371 (c)(1),
(2), (4) Date: Oct. 19, 2004

(87) PCT Pub. No.: WO03/090460

PCT Pub. Date: Oct. 30, 2003

(65) Prior Publication Data

US 2005/0226592 A1    Oct. 13, 2005

(30) Foreign Application Priority Data

Apr. 19, 2002  (JP) .............................. 2002-117249

(51) Int. Cl.
- *H04N 5/93* (2006.01)
- *G11B 27/00* (2006.01)
- *H04N 5/76* (2006.01)

(52) U.S. Cl. .......................................... 386/69; 386/52

(58) Field of Classification Search .................... 386/1, 386/45–46, 125–126, 52, 69
See application file for complete search history.

(56) References Cited

U.S. PATENT DOCUMENTS

| 5,592,301 A | * | 1/1997 | Shimada ...................... 386/117 |
| 5,724,474 A | | 3/1998 | Oguro et al. |
| 7,260,306 B2 | * | 8/2007 | Murata et al. ................. 386/46 |
| 2002/0131764 A1 | * | 9/2002 | David et al. ................... 386/69 |

FOREIGN PATENT DOCUMENTS

| JP | 60-022791 A | 2/1985 |
| JP | 60-259071 A | 12/1985 |

(Continued)

OTHER PUBLICATIONS

International Search Report for application No. PCT/JP03/04674 dated Aug. 12, 2003.

*Primary Examiner*—Thai Tran
*Assistant Examiner*—Nigar Chowdhury
(74) *Attorney, Agent, or Firm*—RatnerPrestia (57) ABSTRACT

An image pick-up apparatus includes an image pick-up device of recording a video to generate a video signal, a photographer indication device of indicating a start of a recording and/or a stop of the recording, an AutoREC signal generation device of generating an AutoREC signal in conjunction with the start of the recording and/or the stop of the recording based on the indication, and an AutoREC signal multiplex device of multiplexing a generated AutoREC signal to a generated video signal.

18 Claims, 7 Drawing Sheets

FOREIGN PATENT DOCUMENTS

| | | |
|---|---|---|
| JP | 05-290549 | 11/1993 |
| JP | 06-121267 A | 4/1994 |
| JP | 06-203538 A | 7/1994 |
| JP | 08-147943 A | 6/1996 |
| JP | 09-046648 | 2/1997 |
| JP | 09-168148 A | 6/1997 |
| JP | 10-290423 A | 10/1998 |
| JP | 11-046336 A | 2/1999 |
| JP | 2000-125240 A | 4/2000 |
| JP | 2000-173247 A | 6/2000 |
| JP | 2001-292421 A | 10/2001 |
| JP | 2001-319464 A | 11/2001 |

* cited by examiner

```
  ┌─────────────────────────────────────┐
  │  video recorder                     │
  │   ┌──────────┐      ┌──────────┐    │
  │   │ AutoREC  │ 32   │ Video    │ 33 │
  │   │ signal   │─────▶│ recording│    │
  │   │ detection│      │ means    │    │
  │   │ means    │      │          │    │
  │   └──────────┘      └──────────┘    │
  │        ▲                 ▲          │
  └────────┼─────────────────┼──────────┘
           │                 │
           │ Video signal, to which AutoREC signal
           │ is multiplexed
           │
      ┌─────────┐
      │Reproducer│ 31
      └─────────┘
```

Fig. 7

AUTOREC SIGNAL MULTIPLEX APPARATUS, AUTOREC SIGNAL MULTIPLEX METHOD, PROGRAM, AND RECORDING MEDIUM

This application is a U.S. National Phase Application of PCT International Application PCT/JP03/04674.

TECHNICAL FIELD OF THE INVENTION

The present invention relates to an AutoREC signal multiplex apparatus, An AutoREC signal multiplex method, a program, and a recording medium for recording and reproducing video signals with a plurality of continuous cuts as video files for respective cuts.

BACKGROUND OF THE INVENTION

When recording a video on a VTR using a video camera, a plurality of cuts are continuously recorded on a tape according to a recording start operation and a recording stop operation.

In a worksite of an editing operation where desired cuts are found out from recorded video materials and rearranged, a workflow has been changing rapidly from a conventional linear editing using a VTR and a Switcher to a computer-based non-linear editing.

When performing the non-linear editing, the video material on the tape is once retrieved on the computer as a video file; the video file is then rearranged by editing software. In this case, since a plurality of cuts are continuously arranged on the tape, if a video signal is simply downloaded to the computer, a plurality of cuts will be retrieved as one video file.

Accordingly, it is necessary to start the editing operation from separating one video file for every cut to divide it into separate video files.

For this reason, operation efficiency is reduced in many cases.

Therefore, a technique of automatically detecting a change between scenes from a video file including a plurality of cuts to automatically divide it into video files for respective cuts (for example, refer to Japanese Patent Application Laid-Open No. HEI 05-290549 official gazette), and a technique of automatically detecting a point where a time code value of a video signal becomes discontinuous to record video files separately (for example, refer to Japanese Patent Application Laid-Open No. HEI 09-46648 official gazette) are considered.

Incidentally, the entire disclosure of the Japanese Patent Application Laid-Open No. HEI 05-290549 official gazette and the Japanese Patent Application Laid-Open No. HEI 09-46648 official gazette are incorporated herein by reference in its entirety.

However, with the technique of automatically detecting a change between the scenes mentioned above, not only a process for automatic division requires a considerable time, but also there may be a case where the cut division is mistaken because a change between scenes with extremely few motions cannot be well detected. In addition, with the technique of automatically detecting the point where a time code value of a video signal becomes discontinuous, since a time code remains continuous even if cuts change, when a time code generator of the video camera is RECRUN during picture taking, there may be a case where the discontinuity of the time code value cannot be well detected.

The present inventor has found that development of a system which can automatically generate a video file for every cut more accurately is strongly required, corresponding to the non-linear editing which has been a mainstream in conjunction with a rapid progress of a computer technology.

DISCLOSURE OF THE INVENTION

Taking such former problems described above into consideration, the present invention aims to provide an AutoREC signal multiplex apparatus, An AutoREC signal multiplex method, a program, and a recording medium, which can record and reproduce a video signal with a plurality of continuous cuts as video files for respective cuts more certainly.

The 1st aspect of the present invention is an AutoREC signal multiplex apparatus comprising:

video signal generation means of generating a video signal by recording a video, indication means of indicating a start of said recording and/or a stop of said recording, AutoREC signal generation means of generating an AutoREC signal which has recording marks to be multiplexed with frames where said recordind is continued, in conjunction with the start of said recording and/or the stop of said recording based on said indication; and AutoREC signal multiplex means of multiplexing said generated AutoREC signal with said generated video signal.

The 2nd aspect of the present invention is the AutoREC signal multiplex apparatus according to the 1st aspect of the present invention, wherein said AutoREC signal multiplex means multiplexes said generated AutoREC signal with said generated video signal at the timing of said indication.

The 3rd aspect of the present invention is the AutoREC signal multiplex apparatus according to the 1st aspect of the present invention, wherein said AutoREC signal is multiplexed with a LTC (Longitudinal Time Code) user's bit or a VITC (Vertical Interval Time Code) user's bit of a frame of said video signal.

The 4th aspect of the present invention is the AutoREC signal multiplex apparatus according to the 1st aspect of the present invention, wherein said AutoREC signal has a start mark to be multiplexed with a frame where said recording is started, and a stop mark to be multiplexed with a frame where said recording is stopped.

The 5th aspect of the present invention is the AutoREC signal multiplex apparatus according to the 4th aspect of the present invention, wherein said AutoREC signal multiplex means multiplexes said start marks with a predetermined number of frames after the frame where said recording is started.

The 6th aspect of the present invention is the AutoREC signal multiplex apparatus according to the 4th aspect of the present invention, wherein said AutoREC signal multiplex means multiplexes said stop marks with a predetermined number of frames before the frame where said recording is stopped.

The 7th present invention is the AutoREC signal multiplex apparatus according to the 1st present invention, wherein said AutoREC signal has recording marks to be multiplexed with frames where said recording is continued.

The 7th aspect of the present invention is an AutoREC signal multiplex method comprising:

a video signal generation step of generating a video signal by recording a video, an indication step of indicating a start of said recording and/or a stop of said recording an AutoREC signal generation step of generating an AutoREC signal which has recording marks to be multiplexed with frames where said recording is continued,in conjunction with the start of said recording and/or the stop of said recording based on said indication; and an AutoREC signal multiplex step of multiplexing said generated AutoREC signal with said generated video signal.

The 8th aspect of the present invention is a program for making a computer execute: the video signal generation step of generating a video signal by recording a video, the AutoREC signal generation step of generating an AutoREC signal, which has recording marks to be multiplexed with frames where said recording is continued, in conjunction with the start of said recording and/or the stop of said recording based on said indication, and the AutoREC signal multiplex step of multiplexing said generated AutoREC signal with said generated video signal; the steps being included in the AutoREC signal multiplex method according to the 7th aspect of the present invention.

The 9th aspect of the present invention is a recording medium which stores the program according to the 8th aspect of the present invention, wherein the recording medium is computer-processible.

The 10th aspect of the present invention is a video signal division apparatus comprising:

AutoREC signal detection means of detecting an AutoREC signal which is (1) generated, based on indication of a start of a recording of a video and/or a stop of said recording, in conjunction with the start of said recording and/or the stop of said recording, and (2) multiplexed with a video signal generated by performing said recording, and video signal division means of dividing said video signal based on a result of said detection.

The 11th aspect of the present invention is the video signal division apparatus according to the 10th aspect of the present invention, wherein said AutoREC signal has a start mark to be multiplexed with a frame where said recording is started, and a stop mark to be multiplexed with a frame where said recording is stopped.

The 12th aspect of the present invention is the video signal division apparatus according to the 11th aspect of the present invention, wherein said video signal division means once divides said generated video signal when said AutoREC signal detection means continuously detects said start marks without detecting said stop marks.

The 13th aspect of the present invention is the video signal division apparatus according to the 10th aspect of the present invention, wherein said AutoREC signal has recording marks to be multiplexed with frames where said recording is continued.

The 14th aspect of the present invention is the video signal division apparatus according to the 13th aspect of the present invention, wherein said video signal division means once divides said generated video signal when said AutoREC signal detection means stops detecting said recording marks.

The 15th aspect of the present invention is the video signal division apparatus according to the 13th aspect of the present invention, wherein said recording mark has a value which changes for every frame.

The 16th aspect of the present invention is the video signal division apparatus according to the 15th aspect of the present invention, wherein said video signal division means once divides said generated video signal when said AutoREC signal detection means continuously detects said recording marks having the same value.

The 17th aspect of the present invention is the video signal division apparatus according to the 10th aspect of the present invention, wherein said generated AutoREC signal is multiplexed again with said divided video signal.

The 18th aspect of the present invention is the video signal division apparatus according to the 10th aspect of the present invention, wherein a predetermined pre-roll video signal is inserted just before said divided video signal.

The 19th aspect of the present invention is a video signal division method comprising:

an AutoREC signal detection step of detecting an AutoREC signal which is (1) generated, based on indication of a start of a recording of a video and/or a stop of said recording, in conjunction with the start of said recording and/or the stop of said recording, and (2) multiplexed with a video signal generated by performing said recording, and a video signal division step of dividing said video signal based on a result of said detection.

The 20th aspect of the present invention is a program for making a computer execute: the AutoREC signal detection step of detecting an AutoREC signal which is (1) generated, based on indication of a start of a recording of a video and/or a stop of said recording, in conjunction with the start of said recording and/or the stop of said recording, and (2) multiplexed with a video signal generated by performing said recording, and the video signal division step of dividing said video signal based on a result of said detection; the steps being included in the video signal division method according to the 19th aspect of the present invention.

The 21st aspect of the present invention is a recording medium which stores the program according to the 20th aspect of the present invention, wherein the recording medium is computer-processible.

The 22nd aspect of the present invention is a video system, comprising:

an AutoREC signal multiplex apparatus, having video signal generation means of generating a video signal by recording a video, indication means of indicating a start of said recording and/or a stop of said recording, AutoREC signal generation means of generating an AutoREC signal in conjunction with the start of said recording and/or the stop of said recording based on said indication, and AutoREC signal multiplex means of multiplexing said generated AutoREC signal with said generated video signal, and a video signal division apparatus, having AutoREC signal detection means of detecting an AutoREC signal which is multiplexed with said video signal, and video signal division means of dividing said video signal based on a result of said detection.

DESCRIPTION OF SYMBOLS

11: Image pick-up means
12: AutoREC signal generation means
13: AutoREC signal multiplex means
14: AutoREC signal detection means
15: Video recording means

DETAILED DESCRIPTION OF THE PREFERRED EMBODIMENTS

Hereinafter, referring to drawings, description will be made of embodiments with regard to the present invention.

Embodiment 1

Figure 1:
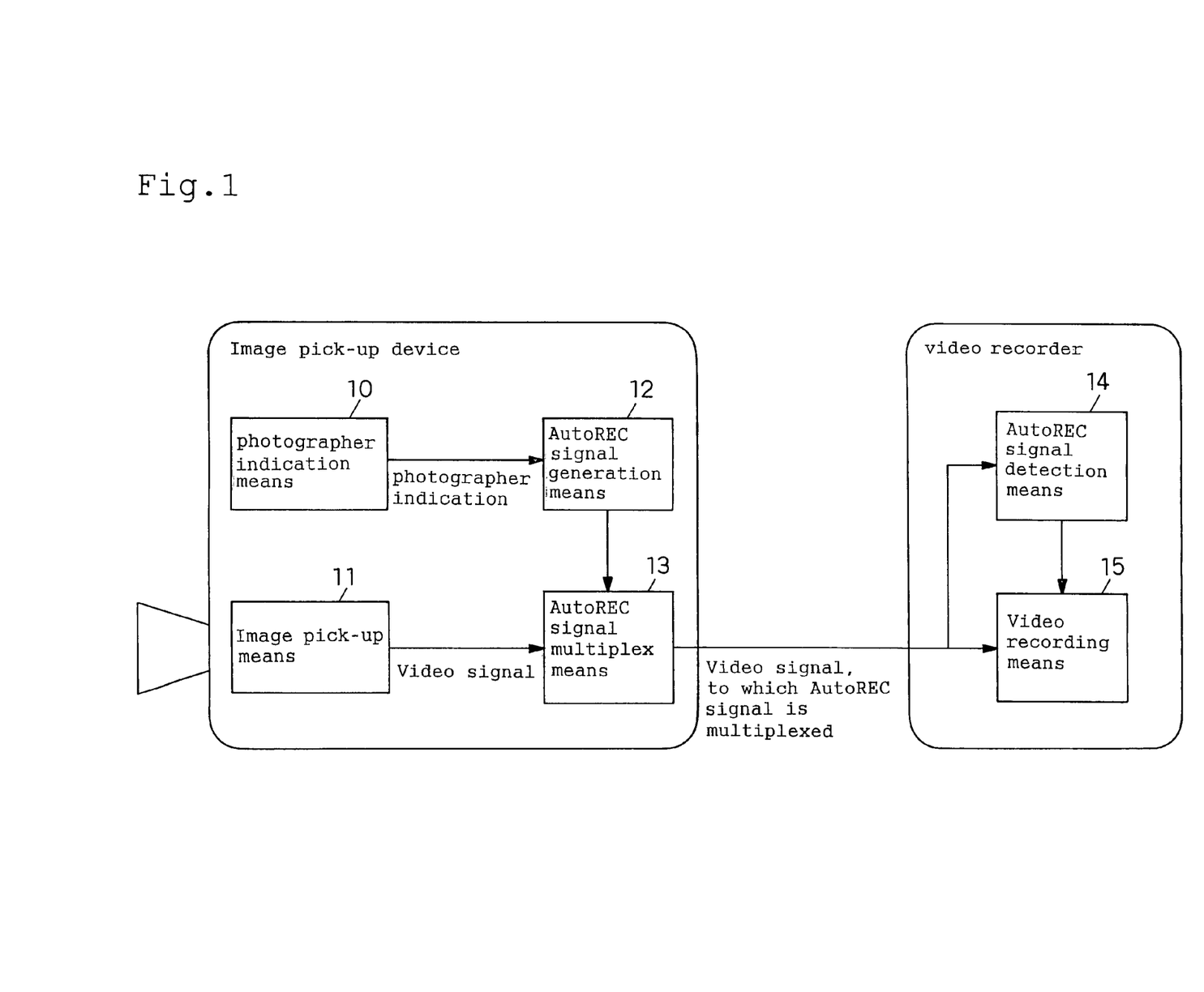
FIG. 1 is a block diagram of a video recording system of Embodiment 1 according to the present invention.

First, mainly referring to FIG. 1 which is a block diagram of a video recording system of embodiment 1 according to the present invention, description will be made of a configuration of the video recording system according to this embodiment.

The video recording system of this embodiment consists of an image pick-up device and a video recorder.

The image pick-up device comprises: photographer indication means 10 of receiving indications of a recording start operation and a recording stop operation from a photographer; image pick-up means 11 of generating a video signal; AutoREC signal generation means 12 of generating an AutoREC signal in conjunction with the recording start operation and stop operation of the image pick-up device; and AutoREC signal multiplex means 13 of multiplexing the AutoREC signal with the video signal.

The video recorder comprises: AutoREC signal detection means 14 of detecting the AutoREC signal which is multiplexed with the video signal; and video recording means 15 of recording the video signal as a separate video file for every cut by performing the video recording start and stop in conjunction with a detected AutoREC signal.

When multiplexing the AutoREC signal with the video signal, it is multiplexed with a LTC (Longitudinal Time Code) user's bit of the video signal or a VITC (Vertical Interval Time Code) user's bit of the video signal. Then, without using a special system, it becomes possible to perform a normal recording/reproduction using an existing video recorder/reproducer with a state where the AutoREC signal is multiplexed with the video signal.

Incidentally, the image pick-up means 11 corresponds to the video signal generation means according to the present invention, the photographer indication means 10 corresponds to the indication means according to the present invention, the AutoREC signal generation means 12 corresponds to the AutoREC signal generation means according to the present invention, the AutoREC signal multiplex means 13 corresponds to the AutoREC signal multiplex means according to the present invention, and the image pick-up device of this embodiment corresponds to the AutoREC signal multiplex apparatus according to the present invention.

In addition, the AutoREC signal detection means 14 corresponds to the AutoREC signal detection means according to the present invention, the video recording means 15 corresponds to the video signal division means according to the present invention, and the video recorder of this embodiment corresponds to the video signal division apparatus according to the present invention.

Then, description will be made of operations of the video recording system of this embodiment. Incidentally, while making description of the operations of the video recording system of this embodiment, description will also be made of one embodiment of an AutoREC signal multiplex method, and a video signal division method, according to the present invention (The same way applies to the other embodiments).

The AutoREC signal multiplex means 13 multiplexes the AutoREC signal generated by the AutoREC signal generation means 12 in conjunction with the recording start operation and stop operation of the photographer received from the photographer indication means 10 with the video signal taken by the image pick-up means 11, and makes it an output signal of the image pick-up device.

Thereby, information on a start point and an end point of a cut is multiplexed with the video signal itself, and it becomes a signal to which an automatic cut division recording can be performed.

Then, the video signal, with which the AutoREC signal is multiplexed, is received into the video recorder.

The video recorder separates the AutoREC signal which is multiplexed with the video signal by the AutoREC signal detection means 14. Then, the video recorder detects the information on the start point and the end point of the cut generated in conjunction with the recording start operation and stop operation of the image pick-up device, and controls the video recording means 15 so as to start the recording at the start point of the cut and to stop the recording at the end point of the cut.

Thereby, it is made possible to automatically record/reproduce video signals with a plurality of continuous cuts as video files for respective cuts.

Then, description will be made of operation of the video recording system of this embodiment in more details.

Figure 2:
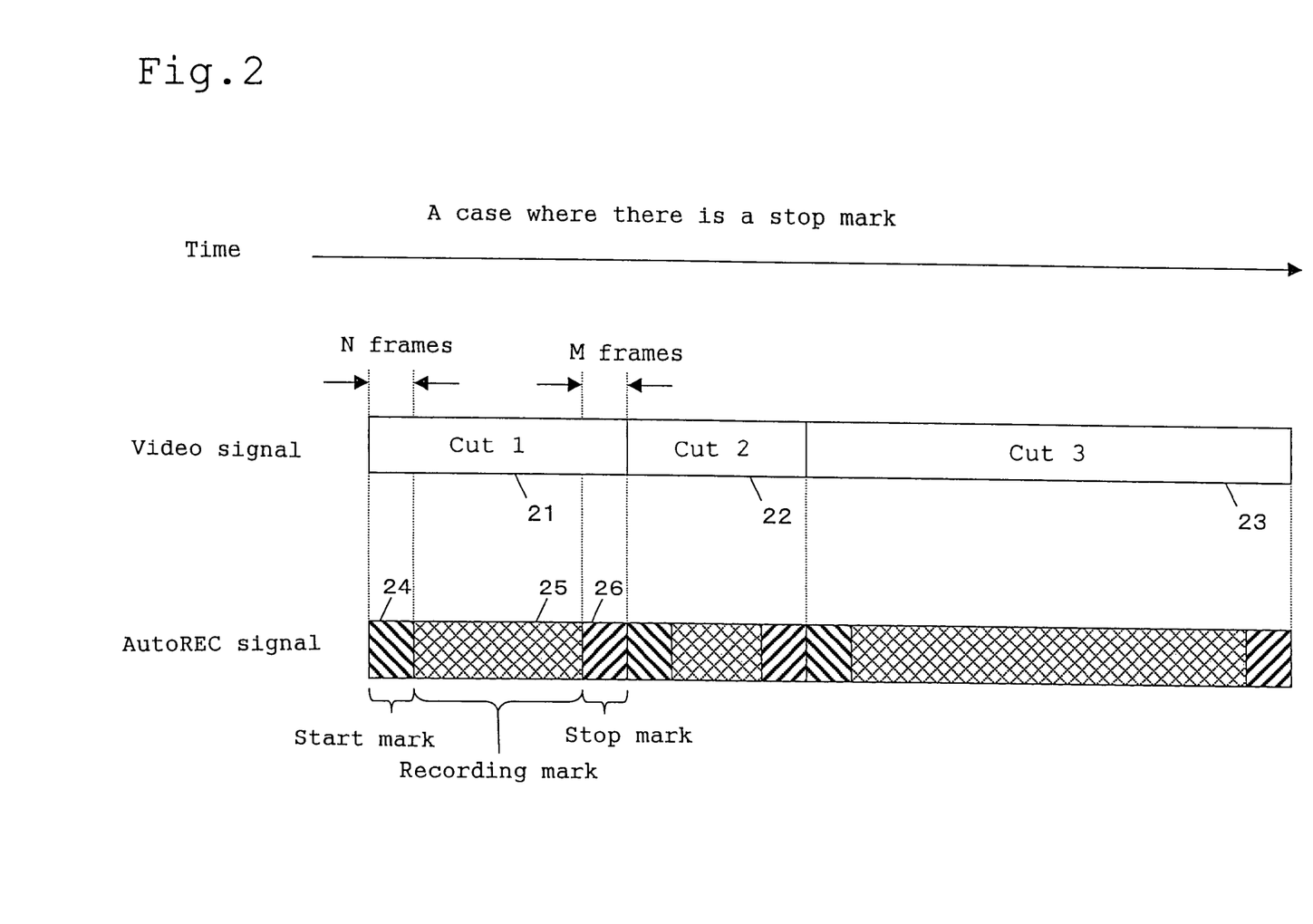
FIG. 2 is a view showing a video signal and an AutoREC signal when there is a stop mark of Embodiment 1 according to the present invention.

FIG. 2 exemplarily shows a typical AutoREC signal in a case where there is a stop mark.

Reference numerals 21-23 represent video signals including three continuous cuts 1-3, reference numeral 24 represents a start mark of an AutoREC signal, reference numeral 25 represents a recording mark of the AutoREC signal, and reference numeral 26 represents a stop mark of the AutoREC signal.

Generally, a plurality of cuts are arranged in video signals which are recorded/transmitted through a video tape, a transmission path or the like.

Also in this embodiment, the photographer performs a recording start operation and stop operation at a start point and an end point of each of cuts 1-3.

The AutoREC signal generation means 12 generates the start mark 24 on head N frames of each of cuts 1-3 by the recording start operation, generates the recording mark 25 during recording, and generates the stop mark 26 on tail M frames of each of cuts 1-3 by the stop operation.

It is important that since the start mark 24 and the stop mark 26 are multiplexed with a plurality of frames, even if several frames which exist in the head and the tail of each cut would drop out during dubbing, an edit process or the like, the function as the AutoREC signal is not lost.

In addition, by multiplexing the recording mark 25 with the frame under recording, it becomes possible to certainly distinguish the frame under recording.

To sum up, the image pick-up device comprises: image pick-up means of generating the video signal; AutoREC signal generation means of generating the AutoREC signal in conjunction with the recording start operation and stop operation of the image pick-up device; and AutoREC signal multiplex means of multiplexing the AutoREC signal with the video signal. In addition, the video recorder comprises: AutoREC signal detection means of detecting the AutoREC signal which is multiplexed with the video signal; and video recording means of recording video signals as a separate video file for every cut by performing the recoding start and stop in conjunction with the detected AutoREC signal. By utilizing such a video recording system, information on the start point and the end point of the cut is multiplexed beforehand with a video material itself during a step of recording the video material. Then, it is made possible to detect a change between the cuts certainly and to record them as separate video files.

In addition, the start mark is continued during a period of at least N frames (N≧1) from a recording start frame of a camera. In addition, the stop mark is continued during a period of at least M frames (M≧1) before a recording stop frame of the camera. Then, since the start mark and the stop mark are multiplexed with a plurality of the frames, even when the head or tail frames of the cuts drop out by the editing operation or the like, the dropout of the AutoREC signal decreases.

Embodiment 2

First, mainly referring to FIG. 3 which is a block diagram of a video recording system of embodiment 2 according to the present invention, description will be made of a configuration of the video recording system of this embodiment.

A video recording system of this embodiment consists of a reproducer 31 and a video recorder.

Figure 3:
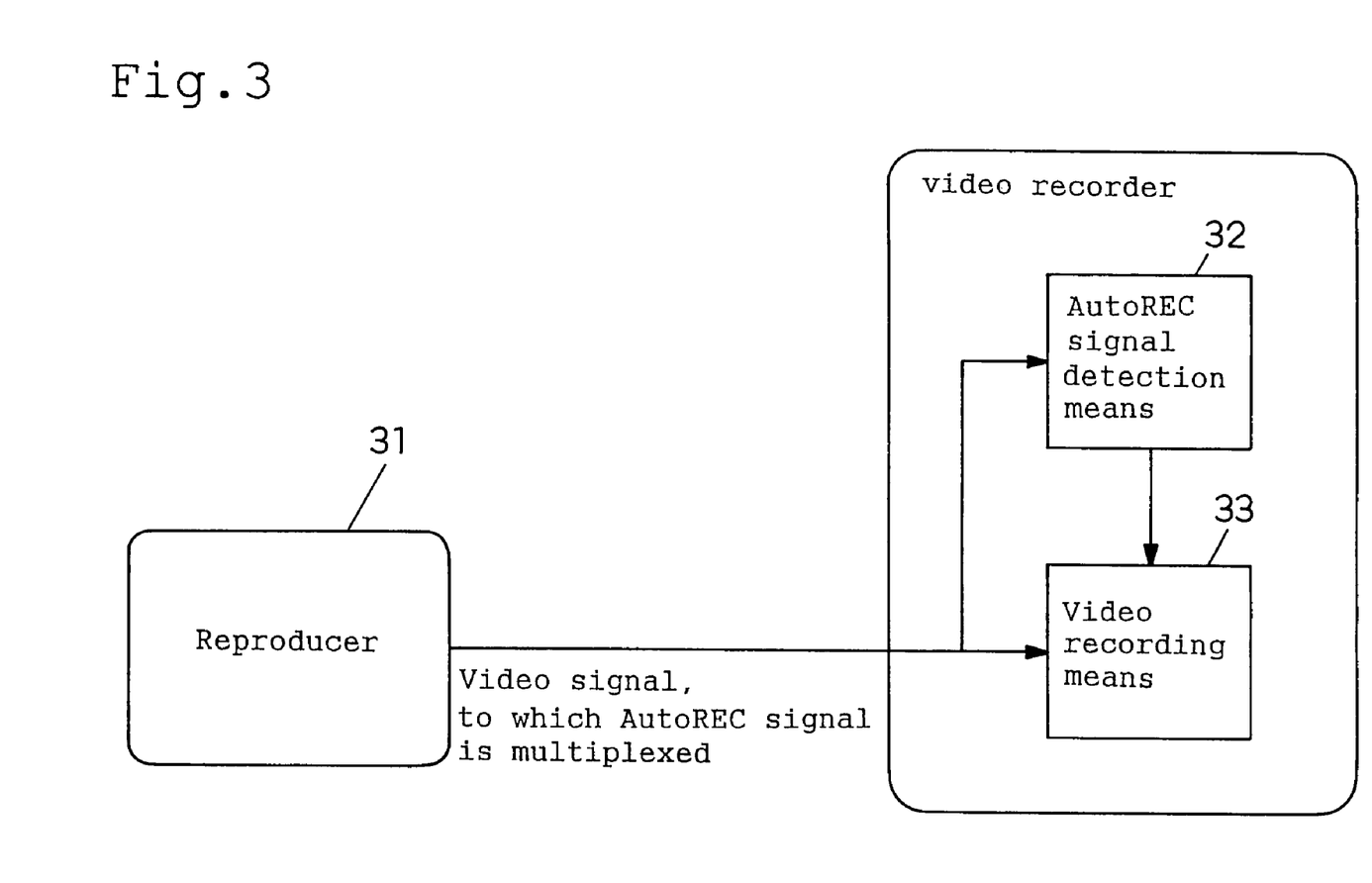
FIG. 3 is a block diagram of a video recording system of Embodiment 2 according to the present invention.

FIG. 3 shows a configuration of the video recorder which receives a video signal, with which the AutoREC signal reproduced by the reproducer 31 is multiplexed, and realizes an automatic cut division recording.

The video recorder of this embodiment comprises: AutoREC signal detection means 32; and video recording means 33.

Incidentally, the AutoREC signal detection means 32 corresponds to the AutoREC signal detection means according to the present invention, the video recording means 33 corresponds to the video signal division means according to the present invention, and the video recorder of this embodiment corresponds to the video signal division apparatus according to the present invention.

Then, description will be made of operation of the video recording system of this embodiment.

When the AutoREC signal is multiplexed with the video signal, and is recorded and reproduced simultaneously, the reproduction video signal from the reproducer is also outputted in a state where the AutoREC signal is multiplexed.

In the video recorder of this embodiment, the AutoREC signal detection means 32 can detect the start point and the end point of the cut based on the start mark, the recording mark, and the stop mark of the AutoREC signal. Then, the AutoREC signal detection means 32 controls the video recording means 33 so as to start recording at the start point of the cut and to stop the recording at the end point of the cut.

Thereby, it is made possible to automatically record the reproduction video signal with a plurality of continuous cuts as video files for respective cuts separately.

To sum up, even when the image pick-up device and the video recorder are not directly connected through a transmission path but the video material is once recorded on the tape or the like, it is possible to certainly perform the automatic cut division to the reproduction video of the tape. Specifically, as mentioned above, the AutoREC signal generation means generates codes showing at least three states, a start mark at the time of a recording start, a recording mark under recording, and a stop mark at the time of a recording stop by a camera, for every frame, and makes them as the AutoREC signal. Therefore, it is possible to detect not only the start point/end point of the cut but also the inside of the effective cut by means of the recording marks.

In addition, the video recording means records simultaneously both the video signal, and the AutoREC signal which is multiplexed with the video signal. Then, the AutoREC signal which is multiplexed with the video signal is also reproduced simultaneously when reproducing the recorded video signal, and the automatic cut division recording of the video signal reproduced becomes available again.

In addition, in the reproducer which continuously reproduces a plurality of video files without interruption, the start mark is multiplexed and outputted during a period of N frames (N≧1) from the head of each video file, the stop mark is multiplexed and outputted during a period of M frames (M≧1) from the tail of each video file, and the recording mark is multiplexed and outputted during another period. Then, the AutoREC signal for every cut can be multiplexed also with the video signal after rearranging and editing the video file, and the automatic cut division recording of the video signal reproduced becomes available again.

Description has been made in details of the embodiments 1-2 in the above.

Figure 4:
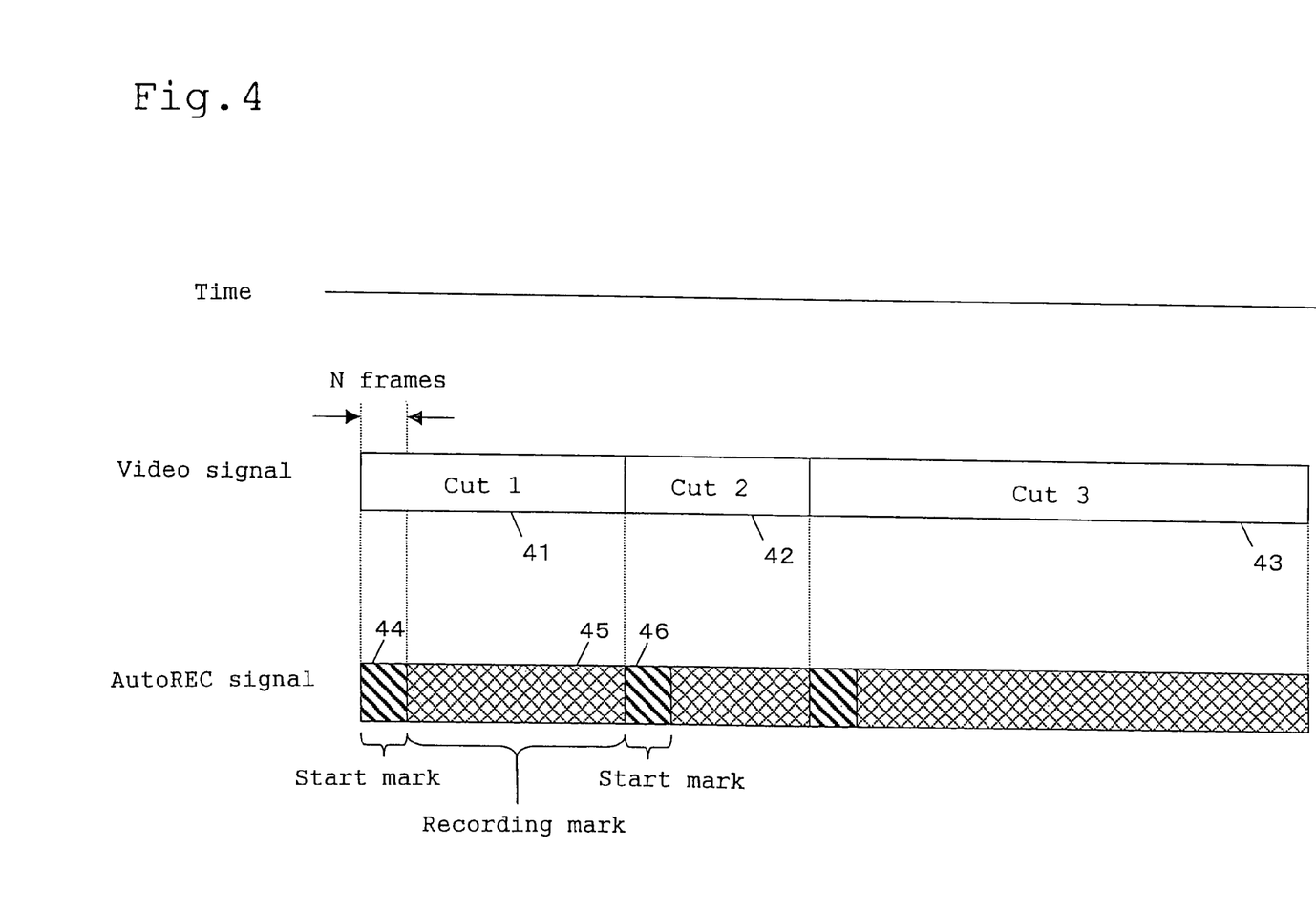
FIG. 4 is a view showing a video signal and an AutoREC signal when there is no stop mark of an embodiment according to the present invention.

(1) Incidentally, FIG. 4 exemplarily shows a typical AutoREC signal in a case where the stop mark has been lost for a reason as mentioned below.

Reference numerals 41-43 are video signals including three continuous cuts 1-3, reference numerals 44 and 46 are start marks of the AutoREC signal, and reference numeral 45 is a recording mark of the AutoREC signal.

Generally, as described in the embodiment mentioned above, the start mark, the recording mark, and the stop mark are multiplexed for every cut.

However, for example, when the video tape is partially overwritten and the video is recorded, there may be a case where the AutoREC signal which has been previously recorded is left in the front and back sections. In addition, there may be a case where the stop mark is erased by overwriting.

In such cases, the stop mark can not be detected ideally.

If the stop mark cannot be detected, as the video recording means 15 (refer to FIG. 1) cannot stop the recording operation permanently, there is a fear that even the recording as a separate video file for every cut becomes impossible.

Therefore, the video recording means 15 (refer to FIG. 1) may be controlled so that the recording is once stopped when the next start mark is detected before detecting the stop mark and the recording of a video file is started as another cut immediately after that.

To sum up, in the AutoREC signal detection means, when the start mark is continuously detected without detecting the stop mark, by starting the recording after stopping the recording once, it becomes possible to perform the automatic cut division even for the video signal in which the stop mark has dropped out, only by detecting the start mark.

Incidentally, when the stop mark cannot be detected, there is also another embodiment of stopping the recording operation as follows.

Figure 5:
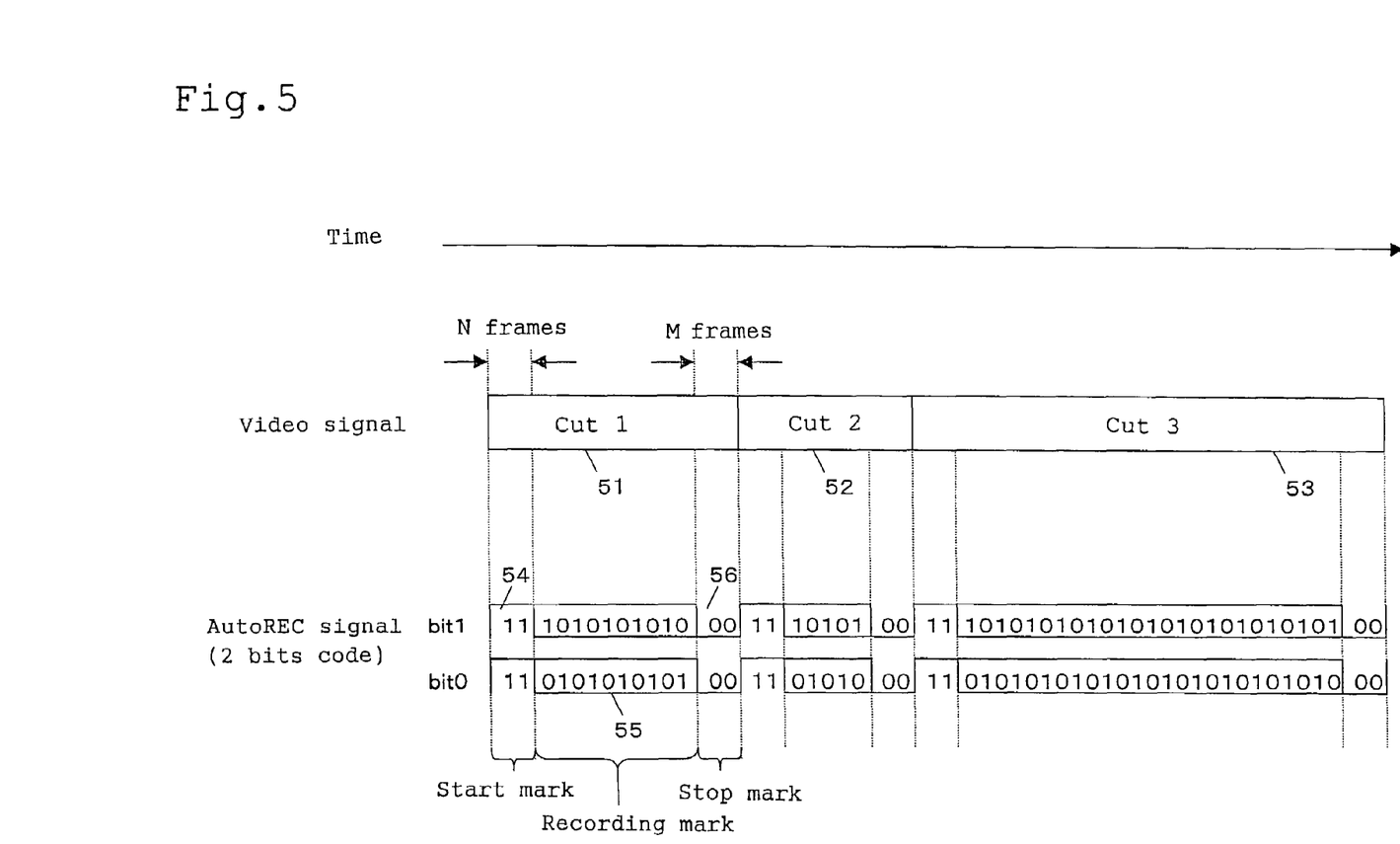
FIG. 5 is a view showing an example of an AutoREC signal represented by 2 bits of an embodiment according to the present invention.

FIG. 5 shows an example of a case where the AutoREC signal is represented by 2 bits.

Reference numerals 51-53 are video signals including three continuous cuts 1-3, reference numeral 54 represents the start mark of the AutoREC signal in code "11" with 2 bits, reference numeral 55 represents the recording mark of the AutoREC signal in alternately inverting codes "10" and "01" with 2 bits, and reference numeral 56 represents the stop mark of the AutoREC signal in code "00" with 2 bits.

In a case of the reproduction signal of the tapes or the like, on which the video signal represented by the code with the recording mark 55 changing for every frame is recorded, a change of the recording mark (that is, alternate invert of "10" and "01") stops at the same time when the tape reproduction is stopped.

It becomes possible to automatically stop the automatic cut division recording because the change of the recording mark stops.

Of course, although the example where the AutoREC signal is represented by 2 bits is described, the AutoREC signal does not need to be represented by 2 bits, other codes may be used as long as they can appropriately represent the start mark, the recording mark, and the stop mark.

To sum up, a code whose value changes for every frame may be preferably used as the recording mark. Then, even when the reproduction of the tape stops by the user's operation in the middle of performing the automatic cut division recording of the video material once recorded on the tape or the like, the risk that the automatic recording can not be stopped since the stop mark can not permanently be detected is reduced. That is, due to the stop of the change of the recording mark, it becomes possible to automatically stop the recording.

Figure 6:
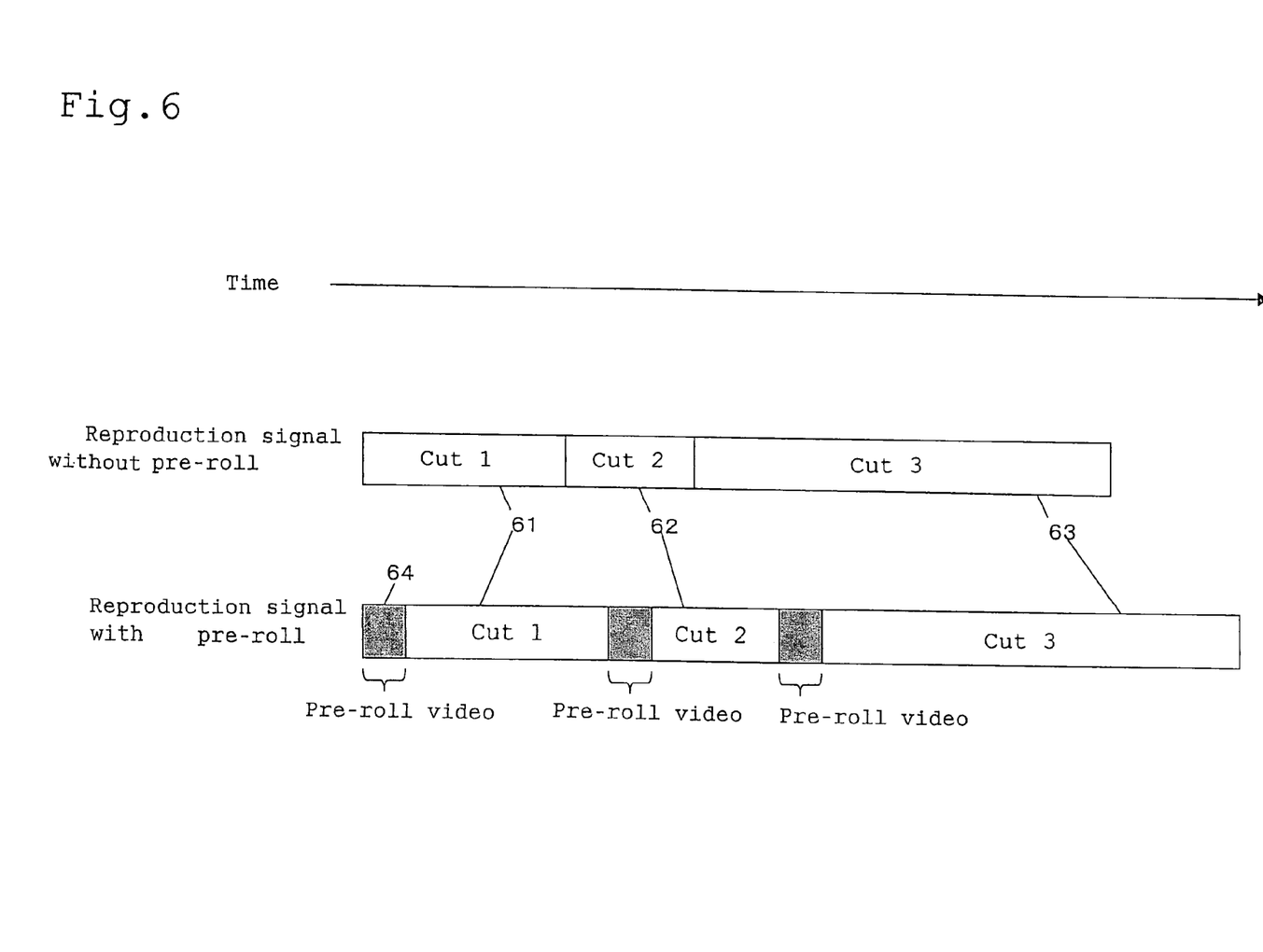
FIG. 6 is a view showing an example of a pre-roll video insertion of an embodiment according to the present invention.

(2) In addition, FIG. 6 exemplarily shows a reproduction video signal in a case where a pre-roll video is inserted and a case where it is not inserted.

Reference numerals 61-63 are video signals including three continuous cuts 1-3, and reference numeral 64 is the pre-roll video.

In the reproduction signal where the pre-roll video is not inserted, three cuts 61-63 are continuously reproduced without interruption.

As compared with this, the case where the pre-roll video is inserted, it is continuously reproduced in a state where a predetermined pre-roll video 64 is inserted just before each of cuts 61-63.

The pre-roll video may be any video, such as a black burst signal (full screen black), a color bar signal, a count-down signal or the like prepared beforehand, which can be distinguished from the cut of general picture taking by a camera.

By inserting the pre-roll video just before each cut and reproducing it, it is possible to arrange a run-up section for the time of the pre-roll video before the reproduction of each cut is started.

For this reason, there is time for rewinding the tape, adjusting the phase or the like to effectively function at the time of the linear editing using a VTR, thereby it becomes possible to perform an accurate editing operation.

To sum up, in the reproducer which continuously reproduces a plurality of video files without interruption, it is preferable to insert a pre-roll video before each of a plurality of continuous cuts, by inserting a predetermined pre-roll video file just before each video file while performing continuous reproduction. By inserting the pre-roll video, it is possible to attach a continuous invalid video before each cut and to make the head of the cut easy to be found out visually. In addition, even when the output video of the reproducer is received into the linear editing system using the VTR, it is possible to secure the pre-roll time in consideration of mechanical start-up time of the VTR.

Figure 7:
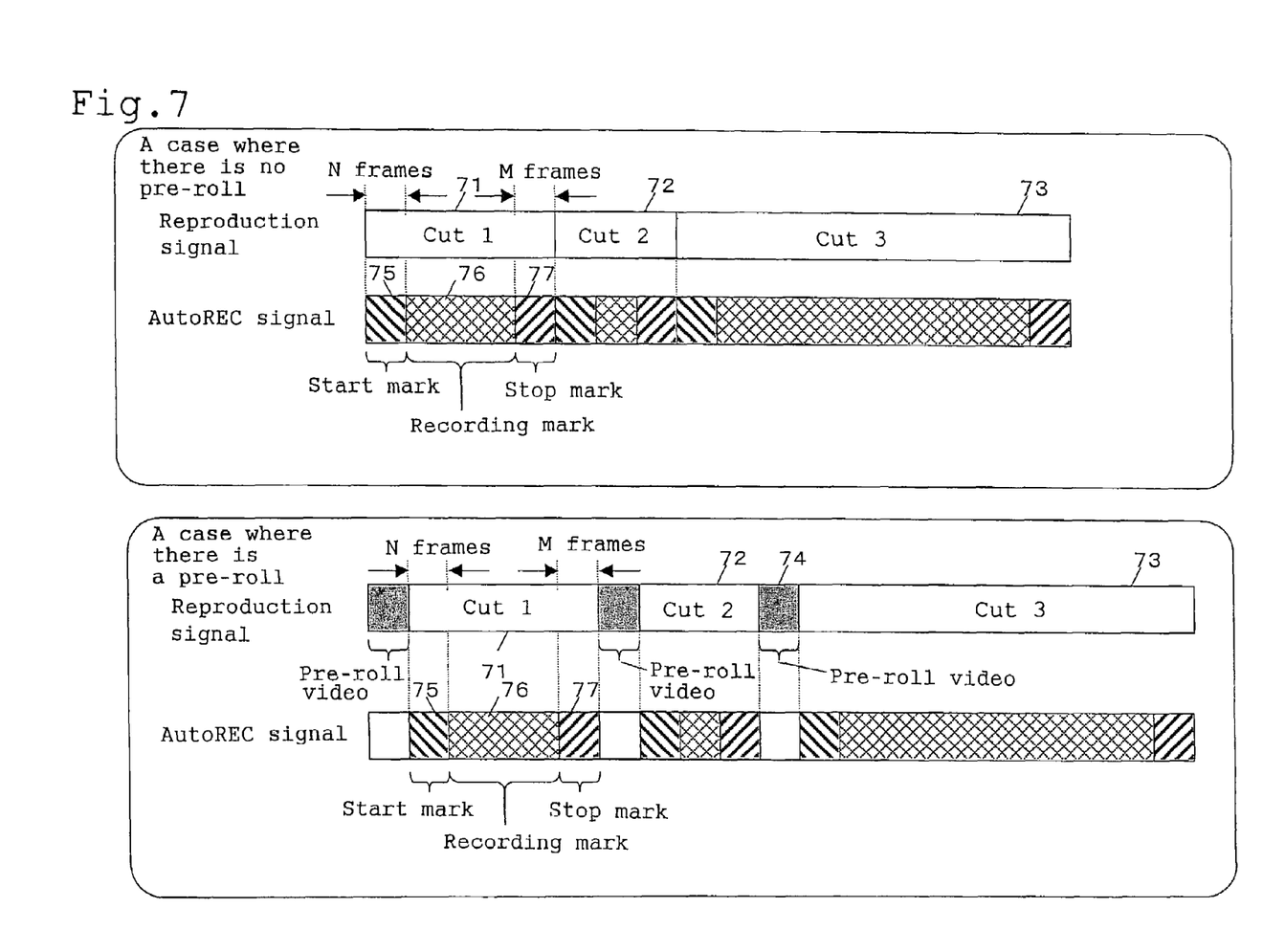
FIG. 7 is a view showing an AutoREC signal in inserting a pre-roll video of an embodiment according to the present invention.

(3) In addition, FIG. 7 exemplarily shows an AutoREC signal in a case where a pre-roll video does not exist and a case where it does exist.

Reference numerals 71-73 are video signals including three continuous cuts 1-3, reference numeral 74 is an inserted pre-roll video, reference numeral 75 is a start mark of the AutoREC signal, reference numeral 76 is a recording mark of the AutoREC signal, and reference numeral 77 is a stop mark of the AutoREC signal.

In the case where the pre-roll video is not inserted, regarding the reproduction video signal, three cuts 71-73 are continuously reproduced without interruption. For every cut basis, the start mark 75 is multiplexed and outputted during a period of the N frames (N≧1) from a reproduction start frame, the recording mark 76 is multiplexed and outputted for the frames under reproduction, and the stop mark 77 is multiplexed and outputted during a period of the M frames (M≧1) before a reproduction stop frame.

On the other hand, in the case where the pre-roll video is inserted and reproduced, the continuous reproduction is performed in a state where the predetermined pre-roll video 74 is inserted just before each of the cuts 71-73. Only to the effective cuts 1-3 other than the pre-roll video, for every cut basis, the start mark 75 is multiplexed and outputted during a period of the N frames (N≧1) from the reproduction start frame, the recording mark 76 is multiplexed and outputted for the frames under reproduction, the stop mark 77 is multiplexed and outputted during a period of the M frames (M≧1) before the reproduction stop frame.

Accordingly, when performing again the automatic cut division recording of the reproduction video signal, in which the pre-roll video is inserted, it becomes possible to automatically record only the effective cuts 1-3 on separate video files with skipping the pre-roll video.

To sum up, by multiplexing the AutoREC signal only with the video files other than the pre-roll video file, the AutoREC signal is multiplexed only with the effective cut without attaching the AutoREC signal to the pre-roll video. Then, when performing the automatic cut division recording of the reproduction output again, in which the pre-roll video is inserted, it is made possible that only the effective cut is recorded.

Thus, it is made possible to automatically record/reproduce video signals with a plurality of continuous cuts as video files for respective cuts separately, and thereby an efficiency of the video editing operation is increased.

Then, the following effects are expectable.

(A) Since the AutoREC signal is multiplexed with the video signal and is recorded/reproduced simultaneously, the video signal itself comes to keep information on the start point and the end point of the cut.

(B) In a case where the automatic cut division recording is performed to the reproduction signal of the tapes or the like recording the video signal with which the AutoREC signal is multiplexed, it becomes possible to automatically stop the automatic cut division recording at the same time when the tape reproduction is stopped.

(C) By inserting and reproducing the pre-roll video, the run-up section of the VTR can be arranged before each cut, thereby it becomes possible to perform the accurate linear editing.

(D) Also in the case of inserting the pre-roll video, the AutoREC signal is multiplexed only with the start point and the end point of the effective cut. For this reason, in a case where the reproduction video, in which the pre-roll video has been inserted, is received to perform the automatic cut division recording again, only the effective cut is recorded.

Incidentally, a program according to the present invention is a program of making a computer execute operations of all or a part of the steps (or processes, operations, functions or the like) of the AutoREC signal multiplex method, and the video signal division method according to the present invention mentioned above, which runs to collaborate with the computer.

In addition, a recording medium according to the present invention is a recording medium storing the program of making a computer execute operations of all or a part of the steps (or processes, operations, functions or the like) of the AutoREC signal multiplex method, and the video signal division method according to the present invention mentioned above, which is computer-readable wherein said read program runs said operations to collaborate with said computer.

Incidentally, above "a part of the steps (or processes, operations, functions or the like)" according to the present invention means one or some steps among a plurality of those steps.

In addition, above "operations of the steps (or processes, operations, functions or the like)" according to the present invention means operations of all or a part of said steps.

In addition, one embodiment of the program according to the present invention may be a form which is recorded on the computer-readable recording medium, and runs to collaborate with the computer.

In addition, one embodiment of the program according to the present invention may be a form which transmits inside a transmission media, is read by the computer, and runs to collaborate with the computer.

In addition, ROMs or the like are included as the recording medium and the transmission medium such as the Internet, light/electric wave/acoustic wave or the like are included as the transmission media.

In addition, the computers according to the present invention mentioned above may be not only pure hardware such as CPUs or the like but also firmware and OS, and may further include peripheral equipment.

Incidentally, as described above the configuration according to the present invention may be realized in software or may be realized in hardware.

The present invention has an advantage in that video signals with a plurality of continuous cuts can be more certainly recorded or reproduced as a video file for every cut.

What is claimed is:

1. An AutoREC signal multiplex apparatus comprising:
   video signal generation means of generating a video signal;
   indication means of indicating a recording start frame and a recording stop frame of said generated video signal;
   video signal recording means of recording said generated video signal, continuous frames of which are contained in a cut from said recording start frame to said recording stop frame;
   AutoREC signal generation means of generating an AutoREC signal, which has recording marks to be multiplexed with said continuous frames contained in said cut; and
   AutoREC signal multiplex means of multiplexing said generated AutoREC signal with said generated video signal,
   wherein said video signal recording means records said video signal with which said generated AutoREC signal has been multiplexed, and
   said recording mark has a value which changes alternately for every frame so that AutoREC signal detection means detects, when said recorded video signal is reproduced, an indication that reproduction of said recorded video signal is stopped.

2. The AutoREC signal multiplex apparatus according to claim 1, wherein said AutoREC signal multiplex means multiplexes said generated AutoREC signal with said generated video signal at the timing of said indication.

3. The AutoREC signal multiplex apparatus according to claim 1, wherein said AutoREC signal is multiplexed with a LTC (Longitudinal Time Code) user's bit or a VITC (Vertical Interval Time Code) user's bit of a frame of said video signal.

4. The AutoREC signal multiplex apparatus according to claim 1, wherein said AutoREC signal has a start mark to be multiplexed with a frame where said recording is started, and a stop mark to be multiplexed with a frame where said recording is stopped.

5. The AutoREC signal multiplex apparatus according to claim 4, wherein said AutoREC signal multiplex means multiplexes said start marks with a predetermined number of frames after the frame where said recording is started.

6. The AutoREC signal multiplex apparatus according to claim 4, wherein said AutoREC signal multiplex means multiplexes said stop marks with a predetermined number of frames before the frame where said recording is stopped.

7. An AutoREC signal multiplex method comprising:
   a video signal generation step of generating a video signal;
   an indication step of indicating a recording start frame and a recording stop frame of said generated video signal;
   a video signal recording step of recording said generated video signal, continuous frames of which are contained in a cut from said recording start frame to said recording ston frame;
   an AutoREC signal generation step of generating an AutoREC signal, which has recording marks to be multiplexed with said continuous frames contained in said cut; and
   an AutoREC signal multiplex step of multiplexing said generated AutoREC signal with said generated video signal,
   wherein said video signal with which said generated AutoREC signal has been multiplexed is recorded, and
   said recording mark has a value which changes alternately for every frame so that an AutoREC signal detection step detects, when said recorded video signal is reproduced, an indication that reproduction of said recorded video signal is stopped.

8. A non-transitory computer-readable recording medium of recording a program, which program causes a computer to act as the video signal generation step of generating a video signal, to act as the video signal recording step of recording said generated video signal, continuous frames of which are contained in a cut from said recording start frame to said recording stop frame, to act as the AutoREC signal generation step of generating an AutoREC signal, which has recording marks to be multiplexed with said continuous frames contained in said cut and to act as the AutoREC signal multiplex step of multiplexing said generated AutoREC signal with said generated video signal, in the AutoREC signal multiplex method of claim 7.

9. A video signal division apparatus comprising:
   video signal reproduction means of reproducing a recorded video signal that has been generated, continuous frames of which are contained in a cut from an indicated recording start frame of said generated video signal to an indicated recording stop frame of said generated video signal, with which an AutoREC signal is multiplexed, said AutoREC signal having been generated and having recording marks multiplexed with said continuous frames contained in said cut;
   AutoREC signal detection means of detecting said AutoREC signal which is multiplexed with said reproduced video signal, and
   video signal division means of dividing said reproduced video signal based on a result of said detection, wherein said recording mark has a value which changes alternately for every frame so that said AutoREC signal detection means detects, when said recorded video signal is reproduced, an indication that reproduction of said recorded video signal is stopped.

10. The video signal division apparatus according to claim 9, wherein said AutoREC signal has a start mark to be multiplexed with a frame where said recording is started, and a stop mark to be multiplexed with a frame where said recording is stopped.

11. The video signal division apparatus according to claim 10, wherein said video signal division means once divides said generated video signal when said AutoREC signal detection means continuously detects said start marks without detecting said stop marks.

12. The video signal division apparatus according to claim 9, wherein said video signal division means once divides said generated video signal when said AutoREC signal detection means stops detecting said recording marks.

13. The video signal division apparatus according to claim 9, wherein said video signal division means once divides said generated video signal when said AutoREC signal detection means continuously detects said recording marks having the same value.

14. The video signal division apparatus according to claim 9, wherein said generated AutoREC signal is multiplexed again with said divided video signal.

15. The video signal division apparatus according to claim 9, wherein a predetermined pre-roll video signal is inserted just before said divided video signal.

16. A video signal division method comprising:
a video signal reproduction step of reproducing a recorded video signal that has been generated, continuous frames of which are contained in a cut from an indicated recording start frame of said generated video signal to an indicated recording stop frame of said generated video signal, with which an AutoREC signal is multiplexed, said AutoREC signal having been generated and having recording marks multiplexed with said continuous frames contained in said cut;
an AutoREC signal detection step of detecting said AutoREC signal which is multiplexed with said reproduced video signal, and
a video signal division step of dividing said reproduced video signal based on a result of said detection,
wherein said recording mark has a value which changes alternately for every frame so that said AutoREC signal detection step detects, when said recorded video signal is reproduced, an indication that reproduction of said recorded video signal is stopped.

17. A non-transitory computer-readable recording medium of recording a program, which program causes a computer to act as the video signal reproduction step of reproducing a recorded video signal that has been generated, continuous frames of which are contained in a cut from an indicated recording start frame of said generated video signal to an indicated recording stop frame of said generated video signal, with which an AutoREC signal is multiplexed, said AutoREC signal having been generated and having recording marks multiplexed with said continuous frames contained in said cut, to act as the AutoREC signal detection step of detecting said AutoREC signal which is multiplexed with said reproduced video signal, and to act as the video signal division step of dividing said reproduced video signal based on a result of said detection, in the video signal division method of claim 16.

18. A video system, comprising:
an AutoREC signal multiplex apparatus, having video signal generation means of generating a video signal, indication means of indicating a recording start frame and a recording stop frame of said generated video signal, video signal recording means of recording said generated video signal, continuous frames of which are contained in a cut from said recording start frame to said recording stop frame, AutoREC signal generation means of generating an AutoREC signal, which has recording marks to be multiplexed with said continuous frames contained in said cut, and AutoREC signal multiplex means of multiplexing said generated AutoREC signal with said generated video signal, said video signal recording means recording said video signal with which said generated AutoREC signal has been multiplexed; and
a video signal division apparatus, having video signal reproduction means of reproducing said recorded video signal with which said generated AutoREC signal is multiplexed, AutoREC signal detection means of detecting said AutoREC signal which is multiplexed with said reproduced video signal, and video signal division means of dividing said reproduced video signal based on a result of said detection,
wherein said recording mark has a value which changes alternately for every frame so that said AutoREC signal detection means detects, when said recorded video signal is reproduced, an indication that reproduction of said recorded video signal is stopped.

* * * * *

UNITED STATES PATENT AND TRADEMARK OFFICE
CERTIFICATE OF CORRECTION

PATENT NO. : 7,639,922 B2
APPLICATION NO. : 10/511831
DATED : December 29, 2009
INVENTOR(S) : Hiroshi Saitoh et al.

It is certified that error appears in the above-identified patent and that said Letters Patent is hereby corrected as shown below:

Column 12

At claim 7, line 25, "ston" should read --stop--.

Signed and Sealed this

Twenty-eighth Day of September, 2010

David J. Kappos
*Director of the United States Patent and Trademark Office*